United States Patent
Leroux et al.

(10) Patent No.: US 7,090,918 B2
(45) Date of Patent: Aug. 15, 2006

(54) EXTERNALLY GLAZED ARTICLE

(75) Inventors: Vincent Leroux, Maubeuge (FR); Martin Fuehrer, Allegheny County, PA (US); Paul Martin Benson, Allegheny County, PA (US)

(73) Assignee: Vesuvius Crucible Company, Wilmington, DE (US)

( * ) Notice: Subject to any disclaimer, the term of this patent is extended or adjusted under 35 U.S.C. 154(b) by 342 days.

(21) Appl. No.: 09/758,741

(22) Filed: Jan. 11, 2001

(65) Prior Publication Data

US 2002/0090514 A1   Jul. 11, 2002

(51) Int. Cl.
 B32B 18/00 (2006.01)

(52) U.S. Cl. .................. 428/325; 428/702; 428/689; 501/80; 501/108; 222/591; 222/606; 222/627; 226/236; 104/437; 104/337; 104/335

(58) Field of Classification Search ................ 501/80, 501/108; 222/591, 606, 627; 226/236; 428/689, 428/325; 104/437, 337, 335; B22D 35/00, B22D 11/10; F27D 3/14
See application file for complete search history.

(56) References Cited

U.S. PATENT DOCUMENTS

| | | | |
|---|---|---|---|
| 4,559,270 A * | 12/1985 | Sara | 428/408 |
| 4,819,840 A * | 4/1989 | Lax et al. | 222/606 |
| 4,951,852 A * | 8/1990 | Rancoulle | |
| 5,252,526 A * | 10/1993 | Whittemore | 501/127 |
| 5,350,609 A * | 9/1994 | Bouchemousse | 428/34.4 |
| 5,370,370 A * | 12/1994 | Benson | |
| 5,602,063 A * | 2/1997 | Dody et al. | |
| 5,632,326 A * | 5/1997 | Gough | |
| 5,673,857 A * | 10/1997 | Meroni et al. | 239/524 |
| 5,908,577 A * | 6/1999 | Yamamura et al. | 222/606 |
| 5,961,874 A * | 10/1999 | Hasebe et al. | 222/606 |

FOREIGN PATENT DOCUMENTS

WO   WO 99/65842   * 12/1999

* cited by examiner

Primary Examiner—Rena Dye
Assistant Examiner—Tamra L. Dicus
(74) Attorney, Agent, or Firm—Robert S. Klemz, Jr.; Donald M. Satina

(57) ABSTRACT

The invention describes an article and method comprising a refractory article having an outer surface covered by an insulating coating over which a protective glaze is applied. The method includes applying a suspension of an insulating coating to a refractory piece, drying the suspension, applying a glaze slip over the coating, and drying the slip to form a protective glaze. In one embodiment, the article comprises a carbon-bonded alumina-graphite nozzle, an insulating coating containing hollow microspheres, and a protective glaze formed from a fusible frit. The invention is described as improving wetting to the refractory piece, reducing delamination of the glaze and insulating coating from the piece, and reducing oxidation of the piece.

9 Claims, 1 Drawing Sheet

EXTERNALLY GLAZED ARTICLE

FIELD OF THE INVENTION

The present invention relates to refractory articles that are used in the casting of molten metal, and particularly to such articles having an insulating layer and a protective glaze.

DESCRIPTION OF THE RELATED ART

In the continuous casting of steel, refractory articles permit the transfer of molten steel between various containers, notably between the ladle and the distributor, and the distributor and the continuous casting mold. Refractory articles often comprise a refractory piece, a protective glaze and an insulating layer. The refractory piece can be prone to oxidation, so the protective glaze is designed as a barrier between the piece and atmospheric oxygen. The insulating layer reduces heat loss, saves energy, improves preheating efficiency, reduces solidification of steel on inside walls, protects the piece from thermal gradients that could lead to cracking and, in the case of pouring components used for a distributor, decreases bridging between the casting component and the mold walls. Insulating layers include, for example, coatings on nozzles, linings for containers and coverings for rollers, and may be fashioned from a single or a plurality of coatings, bricks, panels or the like. A sleeve of insulating refractory material fitted on a stopper rod can improve the preheating efficiency by retaining the heat of the burner.

Prior art insulating layers include sheets or mats of ceramic fibers. The ceramic sheet is fitted over a refractory piece that has been coated with a protective glaze. Although providing good thermal insulation, ceramic sheets have several shortcomings. Fitting of ceramic sheets requires several operations, including cutting, placement and gluing, which can be time-consuming and labor intensive. In uncontrolled conditions, operators fitting the ceramic sheet can inhale ceramic fibers, which are a potential carcinogen.

European Patent No. 0 296 981 teaches an insulating coating, which is obtained from an aqueous suspension containing a finely divided constituent such as fused silica, alumina or zirconia powders, fibers of alumina, silica, zirconia, titanium dioxide or chrome-alumina, and optionally alumina or zirconia beads. The suspension also includes up to 7 wt. % of a binder such as sodium hexametaphosphate or sodium silicate, and up to 40 wt. % of a glass-generating frit. Although reducing the quantity of ceramic fiber, the coating is difficult to install, possesses a relatively high heat transfer coefficient, and resists application of more than one layer.

U.S. patent application Ser. No. 09/719848, which is hereby incorporated by reference, describes an insulating coating, which is applied over a protective glaze. The insulating coating is made from a slip comprising 20–80 wt. % ceramic matrix, 5–40 wt. % insulating microspheres, 5–25 wt. % water and 0.5–20 wt. % of at least one binder conferring a viscosity greater than 8 Pa·s to the slip. The layer is applied as a slip at ambient temperature, has good insulation qualities and may be applied in multiple layers. Unfortunately, in actual use, the layer is subject to peeling and separation from the article during preheating operations. Peeling can deteriorate the protective glaze and expose the article to oxidation. Peeling can also create thermal gradients within the article thereby causing thermally induced cracking.

European Patent Application No. 99870239.3, which is hereby incorporated by reference, teaches an improved insulating coating, which is applied over a protective glaze. The improved coating includes a metal or metal alloy capable of melting during preheating operations. The metal reduces the tendency to peel, especially from flat surfaces as found on nozzles used in thin slab applications. Reduced peeling is expected to yield lower oxidation of the refractory piece.

The metal or metal alloy must be able to melt during either preheating or the first minutes of use so that the liquid or semi-liquid metal or metal alloy can impregnate the pores and (micro)voids within the insulating layer. The metal or metal alloy is preferably selected so as to form a refractory metal oxide in situ. Suitable metals and metal alloys include aluminum, aluminum alloys (such as AA1100, AA5052, etc.), copper, brass, manganese bronze, zinc, and the like.

Unfortunately, the prior art has no consistently satisfactory solution to the peeling of an insulating coating and glaze from a refractory piece, specifically on the wide flat areas present in thin slab nozzles. A need persists for a nozzle having an insulating layer and protective glaze that resists peeling and the subsequent oxidation and cracking.

SUMMARY OF THE INVENTION

The objective of the present invention is a refractory article and a method of making the article comprising a refractory piece, and an insulating coating and a protective glaze that resist peeling from the refractory piece. Reduced peeling can improve oxidation resistance and reduce thermally induced cracking.

One aspect of the invention shows a refractory piece having a first outer surface, an insulating coating having a second outer surface and covering at least a portion of the first outer surface, and a protective glaze covering at least a portion of the second outer surface.

In one embodiment, the refractory article is a carbon-bonded refractory piece containing graphite, the insulating coating forms a cohesive interface with the piece, and the protective glaze includes a silica-containing frit. In another embodiment, the article comprises a submerged entry shroud or nozzle. The insulating coating includes hollow microspheres and covers the outer surface of the nozzle, and the protective glaze covers the insulating layer.

A further aspect of the invention describes a method for making the refractory article comprising placing an insulating coating on at least a portion of an outer surface of a refractory piece and coating a protective glaze over the insulating layer and any exposed outer surface. The insulating coating may be placed on the refractory piece by dipping the piece in or flooding the piece with an aqueous suspension and drying the suspension to form the insulating layer. The glaze may be coated over the insulating layer by any number of methods well known to one skilled in the art.

DETAILED DESCRIPTION OF THE PREFERRED EMBODIMENTS

The present invention includes a refractory article for use in the casting of molten metal comprising a refractory piece having a first outer surface that is covered at least in part by an insulating coating having a second outer surface that is covered at least in part by a protective glaze. The article may be, for example, a shroud or nozzle and is typically a submerged entry shroud or nozzle (SES or SEN, respectively) for transferring molten metal from a tundish to a mold.

Figure 1:
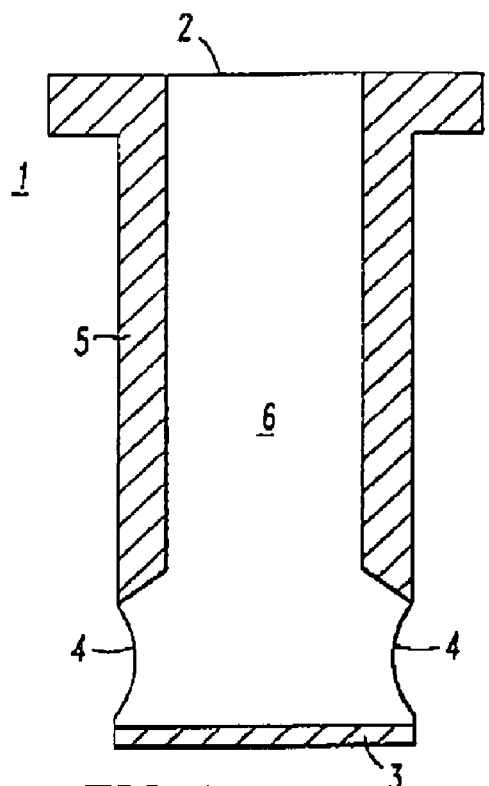
FIG. 1 shows a longitudinal cross-section of a refractory article, specifically a submerged entry nozzle.
Figure 2:
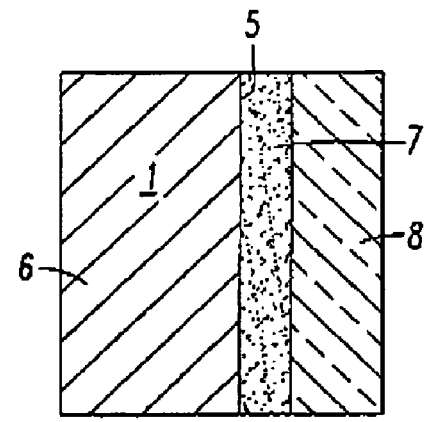
FIG. 2 shows detail of a wall cross-section for a prior art refractory article.

FIG. 1 shows submerged entry shroud 1 of the prior art having an inlet end 2 and an outlet end 3 including at least one exit port 4. The shroud 1 has an outer surface 5 and a bore 6 adapted to transfer molten metal from the inlet end 2 to the port 4. Before use, the shroud 1 will typically be preheated to reduce thermal shock and possible cracking. FIG. 2 shows a cross-section of a wall of a prior art shroud. The shroud 1 has a protective glaze 7 on the outer surface 5 of the shroud 1 to inhibit oxidation during preheating. An insulating layer 8 can be placed over the glaze 7 to reduce both cracking caused by thermal stresses and the energy required during preheating.

Commonly, a SES or SEN is made from a refractory composition comprising carbon-bonded alumina-graphite and other compositions that a glaze has difficulty wetting. Poor wetting can cause pinholes in the protective glaze or delamination of the glaze during preheating. During preheating, thermal stresses at the interfaces may contribute to delamination. Pinholes and delamination expose the refractory composition to the atmosphere and potential oxidation.

Delamination was not readily observable in prior art refractory articles having insulating layers comprising ceramic sheets. The increased use of insulating coatings appears to have exacerbated the problem. Interactions between the refractory piece, the insulating coating and the protective glaze apparently produce stresses that further crack or delaminate the glaze or coating.

An insulating coating includes any type of protective coating that forms a cohesive interface with an underlying substrate. A coating will often thermally insulate the substrate, but a coating can also protect the substrate from mechanical damage, abrasion and thermal shock. A cohesive interface includes any interface where the coating substantially conforms to the substrate so that air does not freely flow or convect along the interface. The coating may be form-fitted over the substrate, applied as a solid preform, such as a sleeve, or applied to the substrate as a deformable material, such as a liquid, slurry, paste, putty and the like.

The insulating coating is preferably applied to the refractory piece as a liquid, such as an aqueous suspension. Application is conveniently done by spraying, dipping, flooding, brushing or otherwise applying the liquid to a substrate. Examples of suitable insulating coatings include, but are not limited to, a suspension comprising 20–80 wt. % ceramic matrix, 5–40 wt. % insulating microspheres, 5–25 wt. % water and 0.5–20 wt. % of at least one binder conferring a viscosity greater than 8 Pa·s to the slip. A metal may be added to improve performance, and such a suspension may comprise 20–80 wt. % ceramic matrix, 5–40 wt. % insulating microspheres, 0.5–15 wt. % one or more binders, 5–20 wt. % of a metal capable of melting under preheat conditions, and up to 25 wt. % water. The ceramic matrix includes vitreous grains, notably silica, preferably atomized silica; and may also include non-vitreous grains such as alumina or magnesia. Preferably, the ceramic matrix comprises no more than 30 wt. % non-vitreous grains, and includes 5–20 wt. % non-vitreous grains such as alumina or magnesia.

Figure 3:
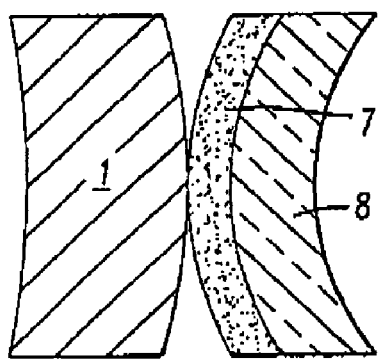
FIG. 3 shows detail of a wall cross-section for a prior art refractory article during preheating.

As previously stated, insulating coatings tend to increase cracking, peeling and delamination from the refractory piece. Possible reasons include the thermal stresses between a refractory piece, an insulating coating and a protective glaze. Without intended to be bound by this explanation, an expanding glaze in a prior art configuration is sandwiched between two materials that typically have lower thermal expansion coefficients. During preheating, thermal stresses can develop and cause cracking and peeling from the refractory piece. FIG. 3 shows an exaggerated view of an expanding glaze 7 forcing the insulating coating 8 away from the piece 1. This expansion results in cracking and peeling. Naturally, the effect is exacerbated over larger areas, such as those found in thin slab nozzles.

Figure 4:
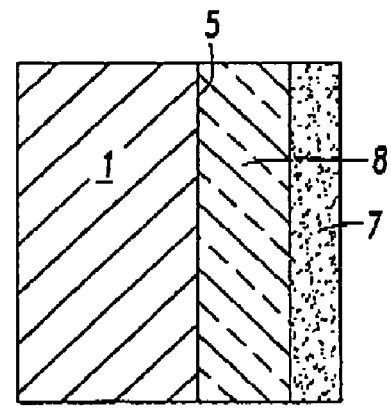
FIG. 4 shows detail of a wall cross-section for a refractory article of the present invention.

The present invention, as depicted in FIG. 4, comprises an insulating coating 8 covering at least a portion of the outer surface 5 of a refractory piece 1. A protective glaze 7 is applied over at least a portion of the insulating layer 8. The refractory piece can be any refractory composition or piece used in the continuous casting of steel. Commonly, the composition comprises a carbon-bonded alumina-graphite; although, several other compositions may be used, such as, for example, compositions comprising zirconia, magnesia, calcia, silica and combinations thereof. The invention may also be used with resin-bonded pieces and oxide-bonded pieces when applicable.

The protective glaze can be any number of refractory glazes. These often comprise frits of fusible compounds, such as silica, and may also include refractory fillers, fluxes, antioxidants, wetting aids and inhibitors. The glaze is conveniently applied as a slip that is dried and fired to produce an oxygen barrier, thereby protecting the refractory piece from oxidation. Firing can occur during preheating.

Prior art insulating layers have typically included flexible ceramic sheets and are relatively loosely wrapped around the refractory piece. If a glaze were used, it would be applied directly to the refractory piece. Loosely wrapped ceramic sheets would not create a cohesive interface with the glaze or, in the absence of a glaze, with the refractory piece. The ceramic sheet would, therefore, exert little stress on the underlying glaze. One skilled in the art would not apply glaze over a flexible ceramic sheet because oxygen could easily penetrate around the loose insulating layer to the refractory piece. Also, a flexible ceramic sheet would not be a suitable substrate for a brittle a protective glaze. In contrast, a rigid insulating coating forms a cohesive interface around a refractory piece and stresses can arise. Prior art continues to glaze the refractory piece first and apply the insulating coating second. It has altered the composition of the insulating coating to combat cracking and peeling with limited success. Prior art has not recognized the probable cause of cracking and how rearrangement of the glaze and coating layers can overcome the problem.

The present invention identifies problems inherent in glazing a refractory article having an insulating coating. The invention describes a solution, namely first applying a insulating coating to a refractory piece and then applying the protective glaze. Preferably, the insulating coating is applied as an aqueous suspension and the glaze is applied as a slip. An advantage of this sequence includes reduced pinholing caused at least in part by the higher viscosity of the suspension compared to the slip. Higher viscosity tends to reduce pinholing and increase coating thickness. The nature of a glaze slip discourages increased viscosity. As an added benefit, glaze tends to adhere better to the insulating coating than to the refractory piece. Better wetting and adhesion often correspond to better oxidation resistance and insulating qualities.

The method of forming the refractory article comprises applying an insulating coating onto at least a portion of a refractory piece and applying a protective glaze over at least a portion of the insulating coating. Conveniently, the insulating coating is applied as an aqueous suspension and the glaze is applied as a slip. Application of either component can occur by spraying, dipping, flooding, brushing or otherwise applying the component to the article. When an insulating coating is applied as a suspension, it should be dried at least in part before applying glaze. The glaze should be fired to form a protective barrier to oxidation. Firing often occurs during preheating of the refractory article.

EXAMPLE

Two identical thin slab nozzles comprising carbon-bonded alumina-graphite were selected. Each nozzle had a flat section towards its outlet end. A first nozzle was coated with a standard glaze slip, and the slip was allowed to dry. A suspension was formed comprising a ceramic matrix, insulating microspheres, a binder, and a metal capable of melting under preheat conditions. The first nozzle was dipped in the suspension and dried. A second nozzle was dipped in the suspension and allowed to dry overnight. The second nozzle was then coated with the standard glaze slip and the slip was allowed to dry.

Both nozzles were heated at 1300° C. for three hours. After cooling, the nozzles were visually inspected for peeling and cracking of the coating and oxidation of the refractory piece. Oxidation was observed by sectioning the nozzles to observe their walls. The first nozzle had significant cracking of its insulating coating on its flat section and spots of the refractory piece were substantially oxidized, presumably where the protective coating had failed. The second nozzle had no visible cracks and the piece was not oxidized.

Obviously, numerous modifications and variations of the present invention are possible. It is, therefore, to be understood that within the scope of the following claims, the invention may be practiced otherwise than as specifically described.

We claim:

1. A refractory article for use in the casting of molten metal comprising a carbon-containing refractory piece having a first outer surface, an insulating coating comprising at least 20 wt. % ceramic matrix and at least 5 wt. % insulating microspheres, the insulating coating covering the first outer surface thereby forming a second outer surface, and a glaze covering at least a portion of the second outer surface.

2. The refractory article of claim 1, wherein the refractory piece comprises a carbon-bonded refractory composition.

3. The refractory article of claim 1, wherein the refractory piece comprises a nozzle.

4. The refractory article of claim 3, wherein the nozzle comprises a thin-slab nozzle.

5. The refractory article of claim 1, wherein the insulating coating is made from an aqueous suspension comprising 20–80 wt. % ceramic matrix, 5–40 wt. % insulating microspheres, 0.5–15 wt. % one or more binders, 5–20 wt. % of a metal capable of melting under preheat conditions, and up to 25 wt. % water.

6. The refractory article of claim 1, wherein the glaze comprises a composition resistant to oxygen diffusion.

7. A refractory article comprising a carbon-containing refractory piece having a bore for flowing molten metal therethrough and a first outer surface, an insulating coating comprising at least 20 wt. % ceramic matrix and at least 5 wt. % insulating microspheres, the insulating coating covering the first outer surface thereby forming a second outer surface, and a glaze covering at least a portion of the second outer surface.

8. The refractory article of claim 1, wherein the insulating coating covers the first outer surface at a thickness up to 7 mm.

9. The refractory article of claim 7, wherein the insulating coating coven the first outer surface at a thickness up to 7 mm.

* * * * *